Figure 1:
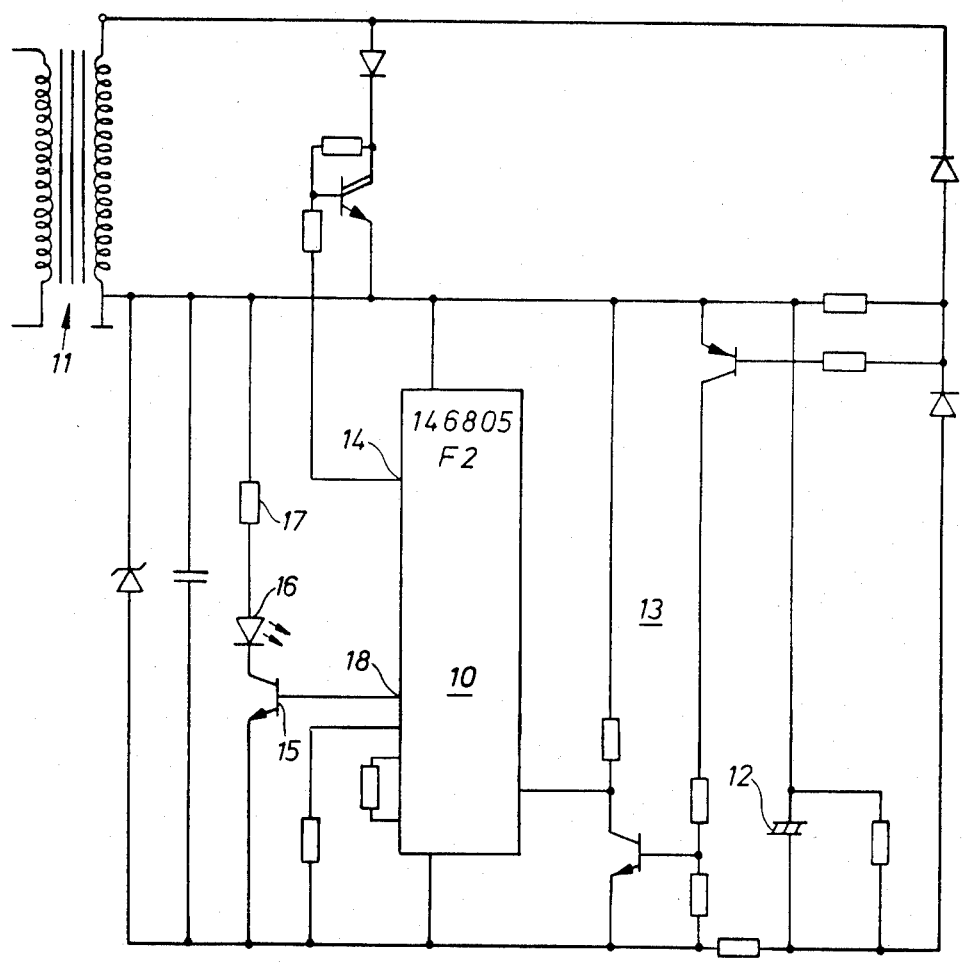

United States Patent [19]

Andreasson et al.

[11] Patent Number: 4,692,753
[45] Date of Patent: Sep. 8, 1987

[54] IGNITION SYSTEM WITH AN R.P.M. INDICATOR

[75] Inventors: Bo C. Andreasson, Göteborg; Bo R. Rangert, Mölnlycke, both of Sweden

[73] Assignee: AB Electrolux, Stockholm, Sweden

[21] Appl. No.: 674,071

[22] Filed: Nov. 23, 1984

[30] Foreign Application Priority Data

Nov. 24, 1983 [SE] Sweden ............... 8306487

[51] Int. Cl.$^4$ .......................... G08B 21/00
[52] U.S. Cl. ................. 340/671; 340/52 R
[58] Field of Search ............ 340/671, 52 R, 62; 123/351; 324/163, 169; 364/431.07, 442

[56] References Cited

U.S. PATENT DOCUMENTS

| | | | |
|---|---|---|---|
| 3,818,342 | 6/1974 | Stevens | 324/169 |
| 3,950,700 | 4/1976 | Weisbart | 340/671 X |
| 4,221,126 | 9/1980 | Cordiano | 340/52 R X |
| 4,274,142 | 6/1981 | Furuhashi et al. | 324/169 X |
| 4,413,249 | 11/1983 | Ohtani et al. | 340/52 R |

FOREIGN PATENT DOCUMENTS 0140230  2/1980  Fed. Rep. of Germany ...... 324/163

Primary Examiner—James L. Rowland
Assistant Examiner—Thomas J. Mullen, Jr.
Attorney, Agent, or Firm—Alfred E. Miller

[57] ABSTRACT

The invention relates to an indicator controlled by the ignition system of an i.c. engine, so that the indicator, e.g. an LED, makes an indication when the engine is adjusted to an appropriate idle r.p.m. or race r.p.m. As the carburetor is calibrated against such selected and adjusted r.p.m. the said adjustment will bring about a minimum of exhaust gases.

11 Claims, 3 Drawing Figures

IGNITION SYSTEM WITH AN R.P.M. INDICATOR

The present invention relates to an ignition system of an i.c. engine and comprises an indicator which indicates when the engine is adjusted to an appropriate idle or race r.p.m., respectively.

I.c. engines exhaust disagreeable gases with a composition which is dependent on the mixture of fuel and air in the engine. For every engine there is an optimal ratio of this mixture in order to achieve the least possible exhaust. Because of different climatic circumstances and different conditions of the engine re-adjustment of the carburetor to such optimal ratio is necessary. The adjustment of the carburetor e.g. of a motor saw is often carried out by a personal estimate of the idle and race r.p.m. and in dependence on the desired cutting capacity of the saw. A more accurate adjustment can be carried out by the use of an r.p.m. meter showing directly the r.p.m., which meter may have markings at the appropriate idle and race r.p.m., respectively.

The present invention presents an arrangement which provides a simplification and an improvement in relation to known devices. The engine is thus provided with an indicator in the form of a light or sound source controlled by the ignition system to indicate an appropriate idle and/or race r.p.m.'s. These r.p.m. are specific for every type of engine, and a minor interval exists in idling and another in racing, where the engine in question has been shown to exhaust the least quantity of noxious gases. These intervals are sensed in the ignition system by electronic circuits programmed to emit a signal to the indicator when the r.p.m. is within the respective interval. In modern ignition systems with micro-computer control of the ignition timing there are a counter and a timer which in digital values state the actual r.p.m. or a corresponding quantity of the engine. Such systems can be provided with memory circuits, amplifiers and an indicator for indicating determined engine speeds. The present invention is directed to the provision of an r.p.m. indicator for such a system.

Figure 2:
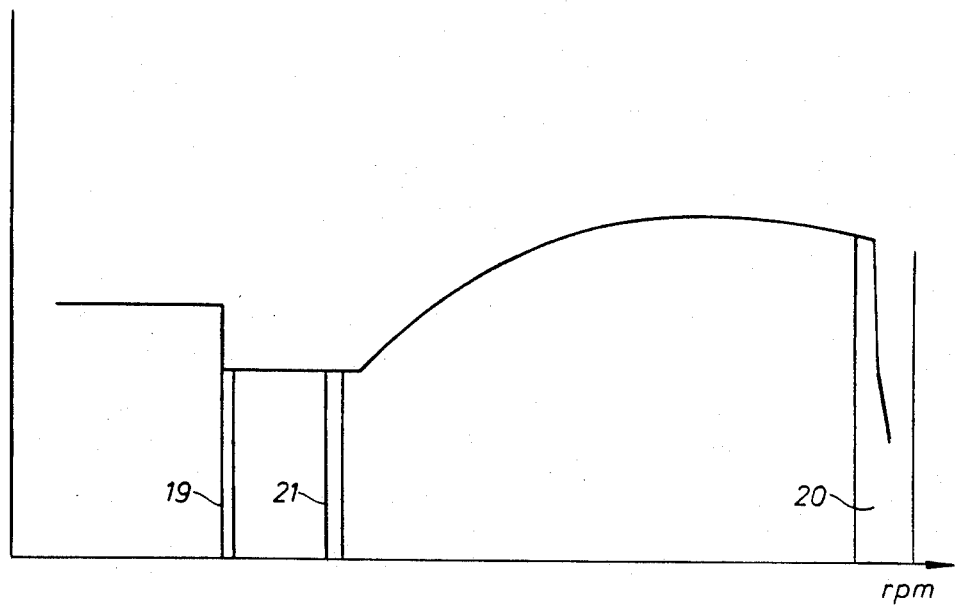
Figure 3:
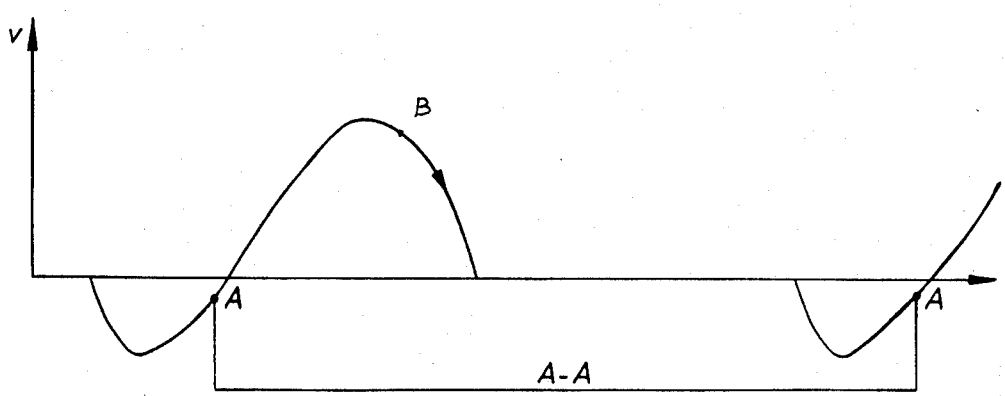

An embodiment of an ignition system indicator of the invention described in the following paragraph with reference to the accompanying drawings which show in FIG. 1 a wiring diagram of the ignition system, in
FIG. 2 another diagram and in
FIG. 3 a primary voltage curve.

The wiring diagram of the ignition system, here provided with a micro-computer 10, is shown in FIG. 1. The current supply to the electronic circuits and the computer is derived from the negative half-waves of the primary winding voltage (FIG. 3) of an ignition generator 11 which keeps a capacitor 12 charged to an operating voltage. A transistor amplifier 13 is provided for feeding pulses at the time of the reference point on the voltage curve. In the present case the reference point is 0.6 V before the curve passes zero on the ascending part thereof. The pulse is supplied to the computer as a start signal of a procedure which is here described in broad outline.

The input of the micro-computer to which the signal is supplied is scanned by the microcomputer and the time A of occurrence of the reference voltage is stored as a reference time. The storing is possible since the micro-computer has a timer running at a fixed frequency. At every reference time the number of timer pulses occurring after the preceding reference time is registered. This number of pulses corresponds to 360° rotation of the crankshaft. By dividing the number of pulses by a predetermined number e.g. 16, a number of pulses remains which corresponds to an ignition advance of $360/16 = 22,5°$. This number is called the reference number and is stored in the static memory of the computer. The reference number can be dependent on the r.p.m. and at a low r.p.m. is inversely proportional (a straight horizontal line in FIG. 2). When the number of timer pulses reaches the reference number (by comparing the numbers in an AND-circuit) the ignition is initiated via an output 14 of the computer. The timer is set to zero each time the reference time passes and the counting to the reference number takes place for every spark. At low r.p.m. the ignition occurs at the point B on the curve in FIG. 3 since the ignition advance is then constant and the ignition has a "phase locking" on the voltage curve. At a high r.p.m. the reference number is dependent on the r.p.m. in a way that an ignition advance curve as shown in FIG. 2 is produced. The number of timer pulses between A—A is then directly or indirectly employed as an address to a position in the memory of the computer where the reference number corresponding to the ignition advance is stored.

The indicator of the invention includes a transistor 15, an LED 16 and a resistor 17. The base of the transistor is connected to an output 18 of the computer which emits a signal derived from the timer and the memory unit in the computer. The transistor amplifies the signal and passes a current from ground through the LED to the negative supply terminal. The LED then indicates that a signal is emitted on this output of the computer. The signal arises in a register which stores r.p.m. intervals in binary codes with some intervals around an appropriate idle r.p.m. with for example a 1–10 degree ignition delay and some around an appropriate race r.p.m. The register is fed with output code from the timer which during the ignition procedure in every cycle of the crankshaft counts up to a code which can be comprehended as a value of the r.p.m. of the engine. A sensitive interval 19 in the register around the idle r.p.m. and another internal 20 around the race r.p.m. enable the emission of said signal when they are initiated by the output code of the timer. This will occur only when the code corresponds to an r.p.m. within the respective sensitive interval. When the code (and the r.p.m.) is outside these intervals there will be no signal.

The pratical use of this device is such that first the operator with the help of an idling screw on the carburetor at a released throttle control, adjusts the r.p.m. of the engine until an indication for an appropriate idle r.p.m. appears on the indicator. After that the throttle is opened wide and the adjustment screws for the gas mixture in the carburetor are so adjusted that an indication for an appropriate race r.p.m. appears on the indicator. Engines within the same production series are identical and have the same sensitive interval for idling and the same sensitive interval for racing. If the ignition system shall be used in other types of engines it is possible to use other intervals. The selection of sensitive interval can suitably be effected by providing a switch to selectively apply the pulses from amplifier 13 to one of several inputs of the computer. The system can thereby be given a wide range of use.

In the introduction an example of engines in motor saws was mentioned having a need for adjustment of idle and race r.p.m. A third r.p.m. which is characteristic of motor saws is the so-called start r.p.m. which is used when the engine is started with a locked throttle control. This r.p.m. is somewhat below the clutching r.p.m. of a centrifugal clutch which in duty transfers power from the engine to the saw chain. The chain should not be moving when the engine is started since otherwise it can cause injury. Thus, above idling but below the clutching r.p.m. there is a sensitive interval 21 which is used as said start r.p.m. The principle of arranging this interval in the computer is the same as the other sensitive intervals, however, the marking of this third one takes place suitably by making the indication in a certain intensity or the like in order not to confuse the several markings with one another.

We claim:

1. In an internal combustion engine system having a carburetor adjustable to control an r.p.m. of the engine, means for providing a signal corresponding to the r.p.m. of said engine, and ignition control means responsive to said signal for controlling the ignition of said engine; the improvement comprising an indicator, and means responsive to said signal for energizing said indicator to provide a substantially constant indication in an idle range of r.p.m. of the engine while de-energizing said indicator at r.p.m. immediately above and below said idle range, said responsive means being further responsive to energize said indicator to provide a substantially constant indication in a range of predetermined race r.p.m. of said engine corresponding to the highest allowable r.p.m. range of said engine.

2. The engine system of claim 1 wherein said responsive means further comprises means responsive to said signal for energising said indicator to provide a substantially constant indication different than said first mentioned indication in a predetermined r.p.m. range corresponding to the desired start r.p.m. range of said engine, and to de-energize said indicator immediately above and below said start r.p.m. range.

3. The engine system of claim 1 wherein said indicator comprises an LED, and amplifier means connected to responsive means for energising said LED.

4. The engine system of claim 1 wherein said means providing a signal comprises a microcomputer, said responsive means comprising means for storing codes corresponding to a plurality of r.p.m. ranges, and means responsive to said signal for selecting said codes as a function of the r.p.m. of said engine system.

5. The engine system of claim 4 wherein said microcomputer comprises a timer running at a fixed frequency, said microcomputer being connected to restart said timer once for each cycle of said engine system, said timer producing said signal.

6. In an internal combustion engine system having a carburetor adjustable to control an r.p.m. of the engine system, a microcomputer having a timer, means applying pulses to said microcomputer responsive to rotation of said engine, said microcomputer having a timer responsive to said pulses for producing an r.p.m. responsive signal, and means responsive to said signal for controlling the ignition advance of said engine system; the improvement further comprising an indicator, said microcomputer having register means storing codes corresponding to a plurality of different spaced predetermined r.p.m. ranges, means responsive to selection of any of said ranges for energizing said indicator to provide a constant indication for the selected range, and means responsive to said signal for selecting said range of said storing means when the r.p.m. represented by the signal corresponds to the respective range, whereby said indicator is energized only at determined r.p.m. ranges of said engine system.

7. The system of claim 6 wherein one of said ranges is an idle r.p.m. range of said engine system.

8. The engine system of claim 7 wherein said idle range corresponds to an ignition delay of 1–10 degrees of said engine system.

9. The engine system of claim 7 wherein another of said ranges corresponds to a race r.p.m. range of highest allowable r.p.m. of said engine system.

10. The engine system of claim 9 wherein another of said ranges comprises the starting range of r.p.m. of said engine system, between said idle range and race range.

11. The engine system of claim 10 wherein means are provided for energising said indicator for a different indication at said starting range than at said idle range.

* * * * *